United States Patent Office 3,533,798
Patented Oct. 13, 1970

3,533,798
LIGHT-SENSITIVE MATERIAL COMPRISING A CYCLIC IMIDE
Gerhard Muller, Erwin Ranz, Rudolf Merten, and Harald von Rintelen, Leverkusen, Germany, assignors to Agfa-Gevaert Aktiengesellschaft, Leverkusen, Germany, a corporation of Germany
No Drawing. Filed May 2, 1967, Ser. No. 635,372
Claims priority, application Germany, June 8, 1966, A 52,692
Int. Cl. G03c 1/52
U.S. Cl. 96—90                                  7 Claims

ABSTRACT OF THE DISCLOSURE

Compounds having the formula:

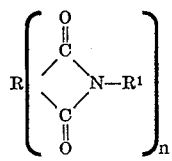

as explained below turn dark after relatively short exposure to UV and are suitable for photographic use. Precursors such as:

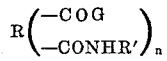

where G is OH, Cl or esterfied hydoxy, can form the photographic layer and be converted to the above compounds as by heat and/or dehydration before photographic use.

---

Numerous processes are known in which light-sensitive organic compounds are used for recording an image. Some of these processes are based on photochemical rearrangements or reactions of organic compounds, leading to color changes. Such photochemical reactions of organic compounds have been comprehensively described, e.g. in "Präparative organische Photochemie" (A. Schönberg, Springer Verlag 1958) and "Light-sensitive systems" (J. Kosar, John Wiley and Sons, New York, 1965). Such reactions include, for example, the formation of monomethine dyes by photolysis of trihalogen methyl compounds in ultraviolet light in the presence of aromatic or heterocyclic compounds of the type which, by reason of their structure, have CH ring members that are especially reactive in condensation or diazo coupling.

In these processes, the original layers are light-sensitive or the reactants for the photochemical reaction have to be added to the layer before exposure. The systems hitherto known are only of limited utility in practice since their light-sensitivity is too low.

It is among the objects of the invention to provide light-sensitive materials that are free from silver halide and have sufficient light sensitivity and yield sufficiently deeply colored reaction products.

We now have found that photographic materials which contain, as light-sensitive compounds, cyclic imides of the following formula:

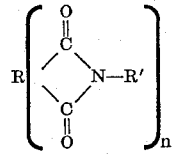

wherein:

R = a $2n$-valent, mononuclear or multinuclear, condensed aromatic radical, preferably a radical of the phenyl or naphthyl series which may be substituted, e.g. with an alkyl radical, especially an alkyl radical having up to 5 C-atoms, such as methyl, ethyl or propyl, or with a halogen atom such as chlorine or bromine or with a nitrile or alkoxy radical, especially alkoxy having up to 5 C-atoms, and the like;

R′ = an olefinically unsaturated linear or cyclic radical, in particular (1) an unsaturated aliphatic radical having up to 8 C-atoms, e.g. allyl, butenyl or pentenyl or (2) an unsaturated cycloaliphatic radical such as cyclohexenyl or cyclopentenyl or dicyclopentenyl or the like, which radicals may be directly or through an alkylene bridge linked to the nitrogen atom or (3) a 5- or 6-membered ring containing a cyclopropane grouping having preferably an endomethylene structure such as a ring selected from the tricyclene series and $n = 2$ or 3, are eminently suitable for image recording.

The compounds described above very rapirdly develop a dark color when exposed to light, especially to UV light, so that photographic images can be obtained in the simplest way by a completely dry process.

Accordingly to the preferred embodiment of the invention, the compounds used in the light-sensitive layer are precursors for the above described cyclic imides, which precursors, in contrast to the said imides, are completely insensitive to light but can be converted into the light-sensitive products of the above formula by a simple brief treatment such as heating or chemical treatment. The products which are insensitive to light are, for instance, the corresponding polyamide polycarboxylic acids.

The cyclic polyimides may be in the form of a 5- or 6-membered cyclic imides. They can be prepared by various known processes, e.g. by the reaction of the corresponding cyclic polyanhydrides with unsaturated aliphatic, cycloaliphatic or heterocyclic amines according to the following reaction scheme:

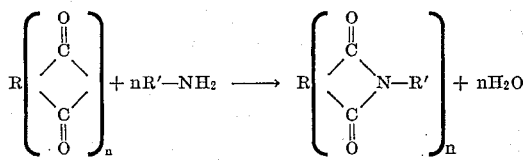

Examples of cyclic polyanhydrides suitable for the preparation of the polyimides according to the invention are pyromellitic acid dianhydride, naphthalene-2,3,6,7-, -1,2,5,6- or 1,4,5,8-tetracarboxylic acid dianhydride or perylene-3,4,9,10-tetracarboxylic acid dianhydride.

Suitable amines are unsaturated aliphatic amines such as allylamine or pentenyl-(3)-amine, unsaturated amines having cycloaliphatic rings, such as dicyclopentenylamine (obtainable e.g. according to German Pat. No. 1,157,598 by addition of urethane to dicyclopentadiene, followed by saponification), 1 - aminomethyl - 3 - cyclohexene, 1-methyl-1-aminomethyl-3-cyclohexene, 1-aminomethyl-4-methyl-3-cyclohexene or 1 - aminomethyl - 3 - methyl-3-cyclohexene, and amines having heterocyclic rings, such as 2-aminomethyldihydropyran. Amines having cyclopropane rings, e.g. 1- and 3-aminonortricyclene can also be used for preparing the polyimides according to the invention.

The reaction of the cyclic polyanhydrides with the unsaturated amines to form the imides is generally carried out in a solvent such as dimethyl formamide or N-methylpyrrolidone. The reaction is effected by heating the components in the solvent up to temperatures of for example about 100 to 250° C. However, the heating can be such as to first obtain the polyamide-polycarboxylic acids which are insensitive to light, in accordance with the following reaction.

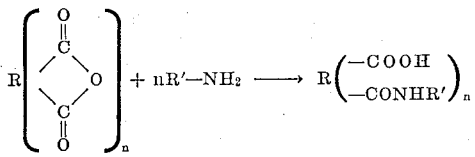

and these intermediates are converted subsequently, e.g. after incorporation into a photographic layer, into the light-sensitive cyclic polyimides either by heat and/or by the action of agents which split off water, such as dicyclohexylcarbodiimide or acetic anhydride/pyridine.

Any compounds that can be converted into cyclic polyimides by thermal or chemical cyclisation, e.g. the corresponding ester amides or acid chloride amides may be used as the precursor compound insensitive to light.

Particular utility is exhibited by the following compounds:

I.

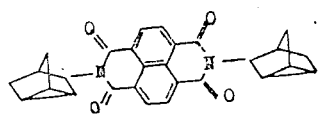

II.

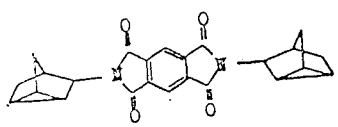

III.

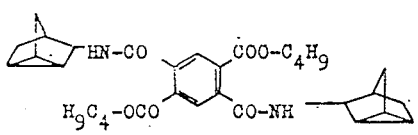

IV.

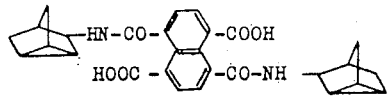

V.

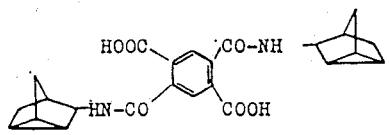

VI.

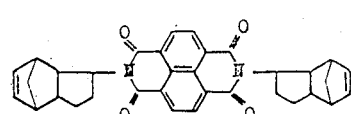

VII.

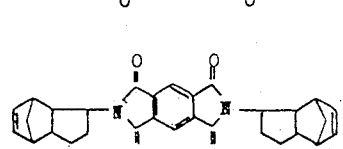

VIII.

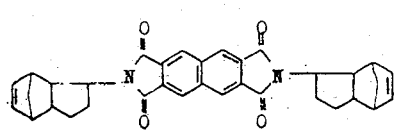

IX.

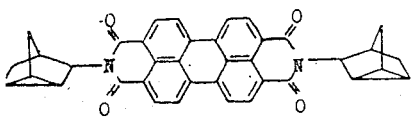

X.

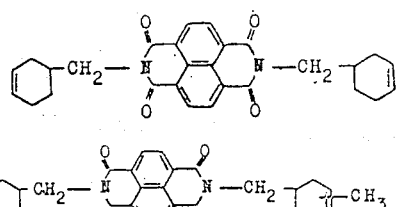

XI.

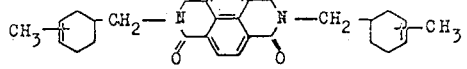

XII.

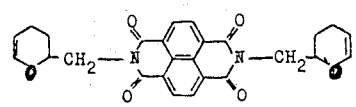

XIII.

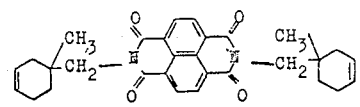

XIV.

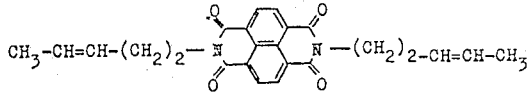

The compounds listed above were prepared as follows:

PREPARATION

Compound I 54.5 parts by weight of 3-nortricyclylamine are dissolved in 250 parts by volume of dimethylformamide. 67 parts by weight of naphthalene-1,4,5,8-tetracarboxylic acid dianhydride are introduced portionwise at room temperature. The reaction mixture is then heated in the dark for 5 hours under reflux, left to cool and filtered. The crystalline residue is washed several times with alcohol. 91 parts by weight of Compound I are obtained. The pale yellow crystals melt at 338 to 342° C. The IR spectrum confirms the imide structure.

Compound II

By a method analogous to that employed for the preparation of Compound I, 21.8 parts by weight of 3-nortricyclylamine in 100 parts by volume of N-methylpyrrolidone are reacted with 21.8 parts by weight of pyromellitic acid dianhyride to form the diimide. The reaction product is obtained in the form of colorless crystals with a yield of 40 parts by weight.

Compound III 91 parts by weight of the dibutyl ester of pyromellitic acid (prepared from pyromellitic acid dianhydride and butanol) are treated in 200 parts by weight of phosphorus oxychloride with 104 parts by weight of phosphorus pentachloride for 6 hours at 40° C. Phosphorus oxychloride is removed from the clear reaction solution in vacuo at a temperature of not higher than 50° C. 102 parts by weight of a crude pyromellitic acid dibutyl ester dichloride are obtained as a liquid residue. This reaction product is then introduced dropwise, at room temperature, into a reaction vessel containing a solution of 60 parts by weight of 3-nortricycylamine and 50 parts by weight of pyridine in 250 parts by volume of anhydrous toluene. Thereafter the reaction mixture is stirred for 3 hours at 50° C., the reaction solution is concentrated by evaporation and the residue is extracted with gasoline for cleaning. 50 parts by weight of the di-(nortricyclyl-3)-amide of pyromellitic acid dibutyl ester having either the structure III or the structure which is isomeric as regards the arrangement of the ester and amide groupings are obtained in the form of colorless crystals of melting point 185° C. The infrared spectrum confirms the structure.

Compound IV 134 parts by weight of naphthalene-1,4,5,8-tetracarboxylic acid dianhydride are added portionwise at room temperature to a solution of 109 parts by weight of 3-nortricyclylamine in 600 parts by volume of dimethylformamide. The reaction mixture is left to stand overnight at room temperature, and the reaction product which has then crystallized out is filtered and washed with acetone and dried in a vacuum at 50° C. 209 parts by weight of a diamide dicarboxylic acid is obtained which has either the formula of Compound IV or an isomeric structure as regards the arrangement of the carboxylic acid amide grouping and which according to elemental analysis crystallizes with 2 mols of dimethylformamide of crystallization. The melting point of the diimide (which is formed upon splitting off of water) is 338° C.

Compound V

In a manner analogous to that described for Compound IV, 109 parts by weight of 3-norticyclylamine are reacted with 109 parts by weight of pyromellitic acid dianhydride in 600 parts by volume of dimethylformamide at room temperature to form the diamide dicarboxylic acid of Formula V or of an isomeric structure. Yield: 210 parts by weight. The corresponding diimide melts at 333° C. (obtained upon removal of water).

Compound VI 26.8 parts by weight of naphthalene-1,4,5,8-tetracarboxylic acid dianhydride are introduced portionwise at room temperature into a solution of 30 parts by weight of dicyclopentenylamine (prepared according to German Pat. No. 1,157,598 by addition of ethyl carbamate to dicyclopentadiene, followed by saponification) in 200 parts by volume of dimethylformamide. The reaction mixture is heated in the dark under reflux for 5 hours and left to cool. The crystal mass is suction-filtered, washed with alcohol and dried in a vacuum at 100° C.

The reaction product has the formula of Compound VI or a structure which is isomeric as regards the position of the imide ring on the dicyclopentenyl nucleus. Yield: 33 parts by weight. Melting point 265 to 275° C.

Compound VII

By a method analogous to that employed for the preparation of compound VI, 30 parts by weight of dicyclopentenylamine are reacted with 21.8 parts by weight of pyromellitic acid dianhydride in 150 parts by volume of dimethylacetamide to form the diimide. Yield: 27 parts by weight. The colorless crystals melt at 254° C.

Compound VIII

By a method analogous to that employed for compounds VI and VII, 30 parts by weight of diicyclopentenylamine are reacted with 26.8 parts by weight of naphthalene-2,3,6,7-tetracarboxylic acid dianhydride in 200 parts by volume of dimethylacetamide to form the diimide VIII. Yield: 32 parts by weight. Melting point: above 250° C. The imide structure is confirmed by the infrared spectrum.

Compound IX

By a method analogous to that employed for Compound I, 94 parts by weight of the red diimide IX are obtained by reacting 43.6 parts by weight of 3-nortricyclylamine with 78.4 parts by weight of perylene-3,4,9,10-tetracarboxylic acid dianhydride in 300 parts by volume of dimethylformamide. The melting point is above 350° C. The imide structure is confirmed by the IR spectrum.

Compound X

As described for compound I, 44.4 parts by weight of 1-aminomethyl-cyclohexane-(3) are reacted with 53.6 parts by weight of naphthalene-1,4,5,8-tetracarboxylic acid dianhydride in 200 parts by volume of dimethylformamide. 82 parts by weight of the diimide X are obtained in the form of practically colorless crystals which melt at 278 to 282° C.

Compound XI

In the manner described above 50.0 parts by weight of a mixture of 1-aminomethyl-3-methyl- and 1-aminomethyl-4-methy-cyclohexene-(3) are refluxed with 53.6 parts by weight of naphthalene-1,4,5,8-tetracarboxylic acid dianhydride in 250 parts by volume of dimethylformamide for 5 hours to form the corresponding diimide XI. Yield: 88 parts by weight of crystals which melt at 258 to 262° C.

Compound XII 45.2 parts by weight of 2-aminomethyl-dihydropyran are reacted with 53.6 parts by weight of napthalene-1,4,5,8-tetracarboxylic acid dianhydride in 250 parts by volume of dimethylformamide as described for Compound XI to form the diimide XII. Yield: 53 parts by weight of pale grey crystals which melt at 248° C.

Compound XIII

As described for compound XI, 25.0 parts by weight of 1-aminomethyl-1-methyl-cyclohexene-(3) are reacted with 26.8 parts by weight of naphthalene-1,4,5,8-tetracarboxylic acid dianhydride in 150 parts by volume of dimethylformamide. 44 parts by weight of diimide XIII are obtained. The pale greyish pink crystals melt at 265 to 267° C.

Compound XIV

As described for Compound XI, 17.4 parts by weight of 1-amino-pentene-(3) are reacted with 26.8 parts by weight of napthalene-1,4,5,8-tetracarboxylic acid dianhydride in 150 parts by volume of dimethylformamide to form the diimide XIV. Yield: 35 parts by weight; melting point 225° C.

The photochemical reactions of the above mentioned compounds take place both in solution and in the solid phase. In practice, either single light-sensitive polyimides or mixture of several such polyimides, either dissolved or finely divided, are applied with or without binder to any suitable support. Positive images are then obtained by exposure to UV light through a negative half-tone or continuous tone original.

Preferably the light-sensitive compounds are applied in form of a layer, dissolved or dispersed in a film-forming binding agent. Those layers are produced according to known methods, by applying casting solutions or suspensions of the light-sensitive compound in the film-forming binding agent, such as natural colloids or synthetic resins. Suitable binding agents are for example gelatin, cellulose, cellulose esters, cellulose ethers, polycarbonates especially of bisphenylolalkanes, polyesters especially of polyethyene terephthalate, polyamides, polyurethanes and all types of film-forming polymers or copolymers of olefinically unsaturated monomers such as vinyl chloride, vinyl acetate, styrene, olefinically unsaturated carboxylic acids, their esters or other derivatives such as maleic acid anhydride, acrylic acid or methacrylic acid and its derivatives.

The concentration of the light-sensitive substances in the layer can be varied within wide limits. The characteristic curve and maximum density can be influenced by varying the concentration or the thickness of the layer. If binding agents capable of swelling in water, such as gelatin, are used, the pH-value can be varied within the limits at which the binder does not undergo excess changes such as degradation in the case of gelatin. The light-sensitive substances are advantageously used in quantities of 5 to 80% by weight, based on the weight of the dried layer.

The exposure is preferably performed with light containing a considerable amount of UV-rays, for instance sunlight and mercury vapour lamps.

The light-sensitive compounds according to the invention may also be used in self-supporting layers, in which case the same types of film-forming binding agents as those mentioned above are suitable. The nature of the binding agents is not critical and depends on the requirements of the reproduction process for which the photographic element is to be used.

The photographic images obtained can be fixed by rendering the unexposed portions of the cyclic polyimides insensitive to light. This can be accomplished, e.g. by means of reagents which react with unsaturated double bonds or act on cyclopropane rings, e.g. by cleavage. Suitable reagents which react with unsaturated double bonds are, inter alia, halogens such as bromine, chlorine or iodine, hydrohalic acids such as hydrochloric acid or hydrobromic acid, ozone, peroxy acids or hydrogen, sulfene chlorides or sulfur dichloride as well as potassium permanganate.

It is also possible to convert the light-sensitive cyclic polyimides into compounds that are insensitive to light by decomposing the imide grouping, e.g. by hydrolysis to form polyamides.

Separation of exposed and unexposed portions of the light-sensitive cyclic polyimides can also be done by dissolving out one of the components by means of suitable solvents.

EXAMPLE 1

Preparation of the light-sensitive layer

A casting solution consisting of:

12.5 g. of Compound I (ground to particle sizes of about $2\mu$),
300 ml. of water,
250 ml. of gelatin (10% aqueous solution),
25 ml. of glycerol (50% aqueous solution),
12 ml. of a 10% aqueous solution of saponine and
2 ml. of a 30% aqueous solution of formaldehyde is applied to a paper support and dried.

Processing

The final layer is exposed through a continuous tone negative original (silver image) by means of a mercury vapour lamp (500 w.—distance: 30 cm.). The exposure time is 10 sec. A black positive image of the original is obtained with excellent reproduction of the continuous tones.

Similar results are obtained if Compound I is replaced with the same amount of Compounds II or VI.

EXAMPLE 2

A casting solution of:

100 ml. of a 10% solution of Compound I in chloroform and
10 g. of polyvinyl acetate is cast to form a self-supporting foil having a thickness of about $15\mu$. It is processed as described in Example E.

Similar results are obtained if Compound I is replaced with the same amount of Compounds II or VI.

EXAMPLE 3

A casting solution consisting of 200 ml. of 1% solution of Compound I in dimethylformamide,
300 ml. of gelatin (10% aqueous solution),
30 ml. of glycerol (50% aqueous solution),
12 ml. of 10% aqueous solution of saponine,
2.4 ml. of 30% aqueous solution of formaldehyde is applied to a paper support. The layer is processed as described in Example 1.

Similar results are obtained if Compound I is replaced with the same amount of Compounds II or VI.

EXAMPLE 4

A sheet of paper is saturated with a 10% solution of Compound I in chloroform. After removal of the solvent by evaporation, the light-sensitive substance is contained in the support.

Processing can be performed as described in Examples 1 and 3. The exposure time is 2 to 3 minutes.

Similar results are obtained if Compound I is replaced with the same amount of compounds II or VI.

EXAMPLE 5

A casting solution of the following composition:

12.5 g. of Compound IV (soluble in alkaline),
300 ml. of 0.5 N NaOH,
250 ml. of gelatin (10% aqueous solution) to which HCl (1 normal) is added until free amidocarboxylic acid separates as a finely divided precipitate,
25 ml. of glycerol (50% aqueous solution),
12 ml. of a 10% aqueous solution of saponine,
2 ml. of a 30% aqueous solution of formaldehyde is applied to a paper support. The thickness of the layer is $10\mu$. The final layer is not sensitive to light but can be made light-sensitive by a short heating (about ½ minute at 170–200° C.).

Processing

The photographic element is heated to a temperature of about 70 to 250° C. for about 15 sec. to 15 min. depending on the temperature, to convert Compound IV into the light-sensitive diimide. It is further processed as in the foregoing examples.

What is claimed is:

1. A photographic element comprising a support having coated light-sensitive cycle imide of the formula:

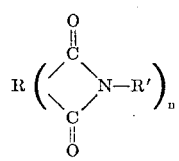

in which:

R=a 2 n-valent, mononuclear or multinuclear aromatic radical;
R'=an olefinically unsaturated linear or cyclic radical or 5- or 6-membered ring which contains a cyclopropane grouping, and
$n$=2 or 3.

2. The combination defined in claim 1, wherein R' is a tricyclene radical.

3. A photographic element comprising a support having coated thereon. A light-sensitive cyclic imide of the formula:

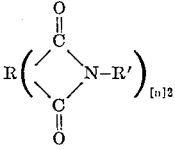

wherein:

R=a phenyl, naphthyl or perylene radical; and
R'=an olefinically unsaturated aliphatic radical having up to 8 carbon atoms, an alkyl radical having up to 3 carbon atoms which is substituted by a cyclohexenyl or cyclopentenyl ring or a tricyclene ring.

4. Light-sensitive material as defined in claim 3 having the formula:

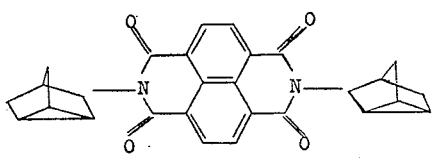

5. Light-sensitive material as defined in claim 3 having the formula:

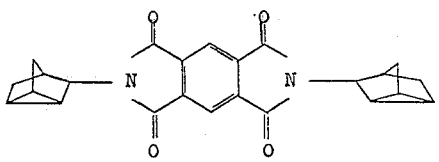

6. Light-sensitive material as defined in claim 3 having the formula:

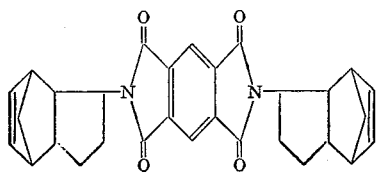

7. Light-sensitive material as defined in claim 3 having the formula:

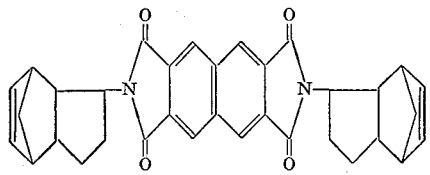

References Cited
UNITED STATES PATENTS
3,345,419   10/1967   Tinsley et al. _____ 260—666

FOREIGN PATENTS
1,213,555   11/1962   Germany.

OTHER REFERENCES
Industrial and Engineering Chemistry, Schenck, Photosensitization, vol. 55, No. 6, June 1963, p. 41.

NORMAN G. TORCHIN, Primary Examiner

J. GOODROW, Assistant Examiner

U.S. Cl. X.R.

96—89